(12) United States Patent
Tierling et al.

(10) Patent No.: US 8,590,379 B2
(45) Date of Patent: *Nov. 26, 2013

(54) SYSTEMS AND METHODS FOR RESONANCE DETECTION

(75) Inventors: Kollin M. Tierling, Militas, CA (US); Danny A. Grant, Laval, CA (US)

(73) Assignee: Immersion Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/446,190

(22) Filed: Apr. 13, 2012

(65) Prior Publication Data

US 2012/0194463 A1 Aug. 2, 2012

Related U.S. Application Data

(63) Continuation of application No. 12/057,186, filed on Mar. 27, 2008, now Pat. No. 8,156,809.

(51) Int. Cl.
*G01H 1/12* (2006.01)
*G01H 13/00* (2006.01)
*G06F 3/01* (2006.01)

(52) U.S. Cl.
USPC .......................................................... 73/579

(58) Field of Classification Search
USPC .......................................................... 73/579
See application file for complete search history.

(56) References Cited

U.S. PATENT DOCUMENTS

| | | | |
|---|---|---|---|
| 3,618,070 A | 11/1971 | Kagan | |
| 3,911,416 A | 10/1975 | Feder | |
| 4,028,502 A | 6/1977 | Moricca et al. | |
| 4,227,319 A | 10/1980 | Guy et al. | |
| 4,262,549 A | 4/1981 | Schwellenbach | |
| 4,278,920 A | 7/1981 | Ruoff, Jr. | |
| 4,333,070 A | 6/1982 | Barnes | |
| 4,352,091 A | 9/1982 | Yamasaki | |

(Continued)

FOREIGN PATENT DOCUMENTS

| | | |
|---|---|---|
| JP | H11-055360 | 7/1997 |
| JP | 2002-060041 | 8/2000 |

(Continued)

OTHER PUBLICATIONS

Curry, K., Supporting Collaborative Interaction in Tele-immersion, Thesis submitted to the Faculty of the Virginia Polytechnic Institute and the State University in partial fulfillment of the requirements for the degree of Master of Science in Computer Science and Applications, 1998.

(Continued)

*Primary Examiner* — Peter MacChiarolo
*Assistant Examiner* — Rose M Miller
(74) *Attorney, Agent, or Firm* — Kilpatrick Townsend & Stockton LLP (57) ABSTRACT

Systems and methods for resonance detection are disclosed. For example, one method for resonance detection includes the step of transmitting an actuator signal to an actuator coupled to a surface of a device. The actuator signal is configured to cause the actuator to output a force to the surface. The method further includes the steps of receiving a response of the surface to the force; determining a resonant frequency of the surface based at least in part on the response; and outputting a signal indicative of the resonant frequency.

20 Claims, 9 Drawing Sheets

(56) References Cited

U.S. PATENT DOCUMENTS

| | | | |
|---|---|---|---|
| 4,421,953 A | 12/1983 | Zielinski | |
| 4,436,188 A | 3/1984 | Jones | |
| 4,464,117 A | 8/1984 | Foerst | |
| 4,484,191 A | 11/1984 | Vavra | |
| 4,581,972 A | 4/1986 | Hoshino | |
| 4,603,284 A | 7/1986 | Perzley | |
| 4,794,392 A | 12/1988 | Selinko | |
| 4,823,634 A | 4/1989 | Culver | |
| 4,853,674 A | 8/1989 | Kiss | |
| 4,918,438 A | 4/1990 | Yamasaki | |
| 4,931,765 A | 6/1990 | Rollins et al. | |
| 4,964,004 A | 10/1990 | Barker | |
| 5,003,984 A | 4/1991 | Muraki et al. | |
| 5,117,449 A | 5/1992 | Metroka et al. | |
| 5,165,897 A | 11/1992 | Johnson | |
| 5,175,459 A | 12/1992 | Danial et al. | |
| 5,189,389 A | 2/1993 | DeLuca et al. | |
| 5,283,970 A | 2/1994 | Aigner | |
| 5,366,376 A | 11/1994 | Copperman et al. | |
| 5,368,484 A | 11/1994 | Copperman et al. | |
| 5,414,337 A | 5/1995 | Schuler | |
| 5,436,622 A | 7/1995 | Gutman et al. | |
| 5,437,607 A | 8/1995 | Taylor | |
| 5,459,382 A | 10/1995 | Jacobus et al. | |
| 5,482,051 A | 1/1996 | Reddy et al. | |
| 5,489,812 A | 2/1996 | Furuhata et al. | |
| 5,506,605 A | 4/1996 | Paley | |
| 5,508,688 A | 4/1996 | Mochizuki | |
| 5,575,761 A | 11/1996 | Hajianpour | |
| 5,619,181 A | 4/1997 | Murray | |
| 5,625,576 A | 4/1997 | Massie et al. | |
| 5,642,413 A | 6/1997 | Little | |
| 5,646,589 A | 7/1997 | Murray et al. | |
| 5,666,473 A | 9/1997 | Wallace | |
| 5,692,956 A | 12/1997 | Rifkin | |
| 5,696,497 A | 12/1997 | Mottier et al. | |
| 5,729,589 A | 3/1998 | Samson | |
| 5,754,096 A | 5/1998 | Muto et al. | |
| 5,757,280 A | 5/1998 | Motohashi | |
| 5,764,751 A | 6/1998 | Konishi | |
| 5,767,787 A | 6/1998 | Kudoh et al. | |
| 5,816,823 A | 10/1998 | Naimark et al. | |
| 5,844,392 A | 12/1998 | Peurach et al. | |
| 5,844,498 A | 12/1998 | Ide | |
| 5,867,796 A | 2/1999 | Inutsuka | |
| 5,873,024 A | 2/1999 | Suzuki | |
| 5,886,262 A | 3/1999 | Sinha | |
| 5,887,995 A | 3/1999 | Holehan | |
| 5,889,670 A | 3/1999 | Schuler et al. | |
| 5,917,906 A | 6/1999 | Thornton | |
| 5,955,964 A | 9/1999 | Tada | |
| 5,956,484 A | 9/1999 | Rosenberg et al. | |
| 5,966,655 A | 10/1999 | Hardouin | |
| 5,973,689 A | 10/1999 | Gallery | |
| 5,988,902 A | 11/1999 | Holehan | |
| 6,014,572 A | 1/2000 | Takahashi | |
| 6,046,726 A | 4/2000 | Keyson | |
| 6,091,321 A | 7/2000 | Karell | |
| 6,113,459 A | 9/2000 | Nammoto | |
| 6,118,979 A | 9/2000 | Powell | |
| 6,131,097 A | 10/2000 | Peurach et al. | |
| 6,175,721 B1 | 1/2001 | Hayato | |
| 6,218,958 B1 | 4/2001 | Eichstaedt et al. | |
| 6,218,966 B1 | 4/2001 | Goodwin et al. | |
| 6,272,319 B1 | 8/2001 | Narusawa | |
| 6,300,938 B1 | 10/2001 | Culver | |
| 6,307,465 B1 | 10/2001 | Kayama et al. | |
| 6,373,463 B1 | 4/2002 | Beeks | |
| 6,374,255 B1 | 4/2002 | Peurach et al. | |
| 6,418,323 B1 | 7/2002 | Bright et al. | |
| 6,424,251 B1 | 7/2002 | Byrne | |
| 6,433,771 B1 | 8/2002 | Yocum et al. | |
| 6,448,977 B1 | 9/2002 | Braun et al. | |
| 6,473,075 B1 | 10/2002 | Gomes et al. | |
| 6,563,487 B2 | 5/2003 | Martin et al. | |
| 6,574,489 B1 | 6/2003 | Uriya | |
| 6,650,338 B1 | 11/2003 | Kolarov et al. | |
| 6,686,901 B2 | 2/2004 | Rosenberg | |
| 6,819,312 B2 | 11/2004 | Fish | |
| 6,864,877 B2 | 3/2005 | Braun et al. | |
| 7,324,094 B2 | 1/2008 | Moilanen et al. | |
| 8,156,809 B2* | 4/2012 | Tierling et al. | 73/579 |
| 2002/0145512 A1 | 10/2002 | Sleichter, III et al. | |
| 2002/0149561 A1 | 10/2002 | Fukumoto et al. | |
| 2002/0177419 A1 | 11/2002 | Hwang | |
| 2003/0030619 A1 | 2/2003 | Martin et al. | |
| 2003/0090460 A1 | 5/2003 | Schena et al. | |
| 2003/0122658 A1 | 7/2003 | Takahashi | |
| 2003/0169151 A1 | 9/2003 | Ebling et al. | |
| 2003/0188594 A1 | 10/2003 | Levin et al. | |
| 2003/0222766 A1 | 12/2003 | Rollins et al. | |
| 2004/0014484 A1 | 1/2004 | Kawashima | |
| 2004/0056840 A1 | 3/2004 | Goldenberg et al. | |
| 2005/0093847 A1 | 5/2005 | Altkorn et al. | |
| 2005/0109145 A1 | 5/2005 | Levin et al. | |
| 2005/0162383 A1 | 7/2005 | Rosenberg | |

FOREIGN PATENT DOCUMENTS

| | | |
|---|---|---|
| JP | 2006-139371 | 11/2004 |
| WO | WO 95/20787 | 8/1995 |
| WO | WO 95/20788 | 8/1995 |
| WO | WO 97/18546 | 5/1997 |
| WO | WO 01/91100 | 11/2001 |
| WO | WO 03/042805 | 5/2003 |

OTHER PUBLICATIONS

Dennerlein, J. et al., Vibrotactile Feedback for Industrial Telemanipulators, Presented at the Sixth Annual Symposium on Haptic Interfaces for Virtual Environment and Teleoperator Systems, ASME IMECE, Dallas, Texas, Nov. 15-21, 1997.

Eberhardt, S. et al., Force Reflection for Wimps: A Button Acquisition Experiment, Proceedings of the ASME Dynamic Systems and Control Division, presented at the 1997 ASME International Mechanical Engineering Congress and Exposition, Nov. 16-21, 1997, Dallas, Texas.

IEEE International Conference on Robotics and Automation, May 16-20, 1998, Lueven, Belgium.

Hayward, V. et al., Parameter Sensitivity Analysis for Design and Control of Force Transmission Systems, McGill University Center for Intelligent Machines, 3480 University Street, Montreal, Quebec, Canada.

Kim, W., Telemanipulator Technology and Space Telerobotics, Proceedings from SPIE—The International Society for Optical Engineering, Sep. 7-9, 1993, Boston, Mass.

Kontarinis, D. et al., Tactile Display of Vibratory Information in Teleoperation and Virtual Environments, Presence, Fall 1995, 4(4):387-402.

Kontarinis, D. et al., Display of High-Frequency Tactile Information to Teleoperators, Harvard University Division of Applied Sciences, Cambridge, Mass.

MaClean, K., Designing with Haptic Feedback, Symposium on Haptic Feedback in the Proceedings of the IEEE Conference on Robotics and Automation, Apr. 22-28, 2000.

Marcus, B., Touch Feedback in Surgery, Official Proceedings of Virtual Reality and Medicine the Cutting Edge, Sep. 8-11, 1994, The New York Hilton.

McAffee, D. et al., Teleoperator Subsystem/ Telerobot Demonstrator: Force Reflecting Hand Controller Equipment Manual, Jet Propulsion Laboratory, Jan. 1988.

McLaughlin, M. et al., The USC Interactive Art Museum: Removing the Barriers between Museums and their Constituencies, web site at htto://ascusc.org/icmc/paperforica.html as available via the Internet and printed Jul. 22, 2003.

Mine, M., Virtual Environment Interaction Techniques, Department of Computer Science, University of North Carolina, Chapel Hill, NC, 1995.

Minsky, M., Computational Haptics: The Sandpaper System for Synthesizing Texture for a Force-Feedback Display, Submitted to the

(56) References Cited

OTHER PUBLICATIONS

Program in Media Arts and Sciences, School of Architecture and Planning, in partial fulfillment of the requirements for the degree of Doctor of Philosophy at the Massachusetts Institute of Technology, Jun. 1995.

Noll, M., Man-Machine Tactile, SID Journal, Jul./Aug. 1972.

Ouh-Young, M. et al., Creating an Illusion of Feel: Control Issues in Force Display, Computer Science Department, University of North Carolina at Chapel Hill, Sep. 16, 1989.

Ouh-Young, M., Force Display in Molecular Docking, The University of North Carolina at Chapel Hill, 1990.

Ouhyoung, M. et al., The Development of a Low-Cost Force Feedback Joystick and its Use in the Virtual Environment. Proceedings of the Third Pacific Conference on Computer Graphics and Applications, Pacific Graphics, Aug. 21-24, 1995.

Pao, L. et al., Synergistic Visual/Haptic Computer Interfaces, Hanoi, Vietnam, pp. 155-162, May 1998.

Patrick, N. et al., Design and Testing of a Non-Reactive, Fingertip, Tactile Display fro Interaction with Remote Environments, Massachusetts Institute of Technology, Department of Mechanical Engineering.

Patrick, N., Design, Construction, and Testing of a Fingertip Tactile Display for Interaction with Virtual and Remote Environments, Submitted to the Department of Mechanical Engineering in partial fulfillment of the requirement for the degree of Masters of Science in Mechanical Engineering at the Mass. University of Technology, Aug. 1990.

Pimentel, K. et al., Virtual Reality through the New Looking Glass, Second Edition, 1995.

Rabinowitz, W. et al., Multidimensional Tactile Displays: Identification of Vibratory Intensity, Frequency, and Contractor Area, Journal of the Acoustical Society of America, vol. 82, No. 4, Oct. 1987.

Ramstein, C., Combining Haptic and Braille Technologies: Design Issues and Pilot Study, Second Annual ACM Conference on Assistive Technology, Apr. 11-12, 1996.

Rosenburg, L., Virtual Fixtures: Perceptual Overlays Enhance Operator Performance in Telepresence Tasks, A Dissertation submitted to the Department of Mechanical Engineering and the Committee on Graduate Studies of Stanford University in partial fulfillment of the requirements for the degree of Doctor of Philosophy, Jun. 1994.

Ruspini, D. et al., The Haptic Display of Complex Graphical Environments, Computer Graphics Proceedings, Annual Conference Series, 1997.

Russo, M., The Design and Implementation of a Three Degree of Freedom Force Output Joystick, Submitted to the Department of Mechanical Engineering in partial fulfillment of the requirement for the degree of Masters of Science in Mechanical Engineering at the Massachusetts Institute of Technology, May 1990.

Safe Flight Instrument Corporation, Coaxial Control Shaker, Part No. C-25502, Jul. 1, 1967, revised Jan. 28, 2002.

Scannell, T., Taking a Joystick Ride, Computer Currents, Boston Edition, vol. 9, No. 11, Nov. 1994.

Schena, B., Patent Application Transmittal, Directional Inertial Tactile Feedback Using Rotating Masses, Sep. 28, 2001.

Schmult, B. et al., Application Areas for a Force-Feedback Joystick, DSC-vol. 49, Advances in Robotics, Mechatronics, and Haptic Interfaces, ASME 1993.

Shimoga, K., Finger Force and Touch Feedback Issues in Dexterous Telemanipulation, Proceedings from the Fourth Annual Conference on Intelligent Robotic Systems for Space Exploration, Rensselaer Plytechnic Institute, Troy, New York, Sep. 30-Oct. 1, 1992.

Snow, E. New Technology Transmittal, Model-X Force Reflecting Hand Controller, Jun. 15, 1989.

SMK, Multi-Functional Touch panel, Force-Feedback Type, Developed, Sep. 30, 2002.

SMK, Force Feedback Type Optical Touch Panel Developed, Oct. 30, 2002.

Stanley, M. et al., Computer Simulation of Interacting Dynamic Mechanical Systems Using Distributed Memory Parallel Processors, DSC-vol. 42, Advances in Robotics, Asme 1992.

Terry, J. et al., Tactile Feedback in a Computer Mouse, Proceedings of the Fourteenth Annual Northeast Bioengineering Conference, Mar. 10-11, 1988, University of New Hampshire, Durham, New Hampshire.

Wiker, S., Teletouch Display Development : Phase 1 Report, Technical Report 1230, Jul. 1988.

Notice of Reasons for Rejection dated Jan. 29, 2013 for corresponding Japanese Patent Application No. 2011-502089.

* cited by examiner

SYSTEMS AND METHODS FOR RESONANCE DETECTION

CROSS REFERENCE TO RELATED APPLICATIONS

This patent application claims priority to U.S. patent application Ser. No. 12/057,186, titled "Systems and Methods for Resonance Detection," filed on Mar. 27, 2008, the entirety of which is hereby incorporated by reference.

FIELD OF THE INVENTION

The present invention generally relates to systems and methods for resonance detection.

BACKGROUND

Electronic device manufacturers strive to produce a rich interface for users. Conventional devices utilize visual and auditory cues to provide feedback to a user. In some interface devices, kinesthetic feedback (such as active and resistive force feedback), and/or tactile feedback (such as vibration, texture, and heat), is also provided to the user, more generally known collectively as "haptic feedback." Haptic feedback can provide cues that enhance and simplify the user interface.

Some conventional devices may not be capable of outputting haptic effects to a user input surface. For example, a touch screen may not have the ability to provide tactile cues to a user. If such a device is equipped to output haptic effects, those haptic effects may be of low quality if characteristics of the touch screen are not considered when generating the haptic effects.

SUMMARY

Embodiments of the present invention provide systems and methods for resonance detection. For example, one embodiment of the present invention comprises a method for resonance detection comprising transmitting an actuator signal to an actuator coupled to a surface of a device, the actuator signal configured to cause the actuator to output a force to the surface; determining a response of the surface to the force; determining a resonant frequency of the surface based at least in part on the response; and outputting the resonant frequency. Another embodiment comprises a computer-readable medium having program code for carrying out such a method.

These illustrative embodiments are mentioned not to limit or define the invention, but to provide examples to aid understanding thereof. Illustrative embodiments are discussed in the Detailed Description, and further description of the invention is provided there. Advantages offered by various embodiments of this invention may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

Embodiments of the present invention provide systems and methods for resonance detection. Methods, systems, and products according to the present invention may be embodied in a number of ways, a non-exhaustive description of which is described below.

Illustrative Resonance Detection

According to one example embodiment, a factory manufactures cellular telephones having haptically-enabled touch screens. The cell phones are configured with piezo-electric actuators to output haptic effects to the touch screens at approximately the mechanical resonant frequency of the touch screen. It may be advantageous to output forces at the resonant frequency of the touch screen because resonant vibrations can more efficiently cause large magnitude vibrations on the touch screen.

However, because the manufacturing process is prone to variation, the resonant frequency of the touch screens in the cell phones may vary. Thus, it may be desirable to individually determine the resonant frequency for each touch screen. The factory may thus employ one or more embodiments to efficiently determine the resonant frequency of a surface, such as a touch screen, on a cell phone.

According to one illustrative embodiment, a system for resonance detection comprises a processor, an actuator, and a sensor. The actuator is configured to receive an actuator signal from the processor and to output a vibration to a surface. The sensor is coupled to the surface and is configured to transmit a sensor signal to the processor indicating the movement of the surface. The processor then instructs the actuator to stop vibrating the surface. The processor then analyzes the movement of the surface as it returns to rest to determine the resonant frequency of the surface. After determining the resonant frequency, the processor may store the resonant frequency in a computer-readable medium associated with the surface. For example, if the surface is a touch screen on a mobile phone, the system may store the resonant frequency in a memory chip within the mobile phone to configure the phone to use the touch screen's resonant frequency.

Such an illustrative embodiment may be advantageous in a manufacturing process because it may allow fast resonant frequency determination of different surfaces in an assembly line process without specialized hardware, and may provide more accurate results as the process is able to measure the resonant frequency of each surface, rather than a representative sample.

This example is given to introduce the reader to the general subject matter discussed herein. The invention is not limited to this example. The following sections describe various embodiments of systems and methods for resonance detection.

System for Resonance Detection

Figure 1:
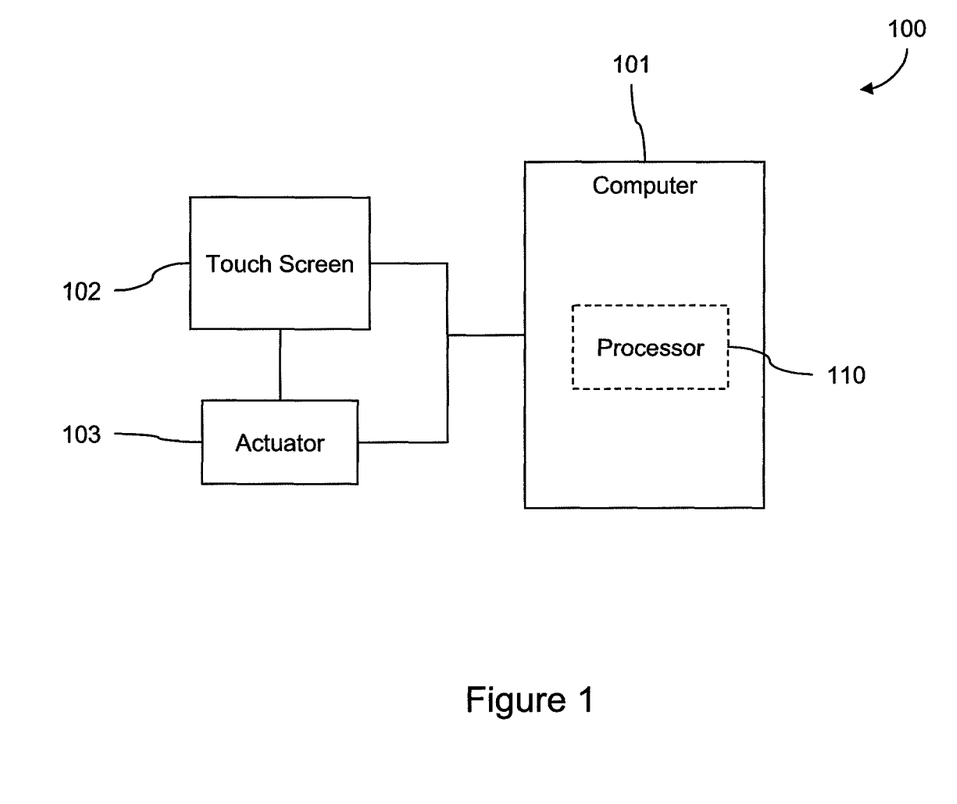
FIG. 1 is a block diagram illustrating a system for resonance detection according to one embodiment.

FIG. 1 is a block diagram illustrating a system 100 for resonance detection according to one embodiment of the present invention. In the illustrative embodiment shown in FIG. 1, the system 100 comprises a computer 101, or other processor-based device, a touch screen 102, and an actuator 103. The computer 101 comprises a processor 110, and is in communication with both the actuator 103 and the touch screen 102. The processor 110 is configured to output an actuator signal to the actuator 103, and to receive an input signal from the actuator 103. The touch screen 102 includes a surface, and a sensor for sensing contact with the surface. In some embodiments of the present invention, the surface comprises a contact surface or a surface intended to be contacted by the user, such as the surface of a touch screen. The actuator 103 comprises a piezo-electric element, and is in communication with the touch screen 102. The actuator 103 is configured to output a force to the touch screen 102. While the actuator 103 used in this illustrative embodiment comprises a piezo-electric actuator, other suitable actuators may be used, and a plurality of actuators of the same or different types may be used as well.

As is known in the art, a piezo-electric element is both capable of outputting forces, and sensing forces applied to the piezo-electric element. When compressed or stretched, a piezo-electric element generates a voltage that can be measured, and used to determine the amount of compression or tension applied.

The system 100 shown in FIG. 1 can determine the resonant frequency of the surface of the touch screen 102. According to this illustrative embodiment, the processor 110 generates an actuator signal and transmits it to the actuator 103. The actuator 103 outputs a force to the touch screen 102 to cause the surface of the touch screen 102 to vibrate. The processor 110 receives a signal from the actuator 103, generated by the piezo-electric element in response to movement by the surface, indicating a response of the surface to the force. The computer 101 then analyzes the response and determines a resonant frequency of the surface.

In the illustrative embodiment, the processor 110 transmits an actuator signal comprising a square wave at a selected frequency to the actuator 103. The actuator 103 outputs a force to the surface having a frequency approximately the same as the actuator signal, causing the surface to vibrate. When the processor 110 stops transmitting the actuator signal, the actuator 103 stops outputting the force, and the surface is allowed to return to rest.

As the surface returns to rest, it will compress and stretch the piezo-electric actuator, generating voltages that are transmitted to the processor. The processor measures the voltages and determines the period of the surface's vibrations as it returns to rest based at least in part on the measured voltages. The measured period (T) can be converted to a frequency (f) by the formula $f=1/T$, which is approximately the resonant frequency of the surface.

Figure 2:
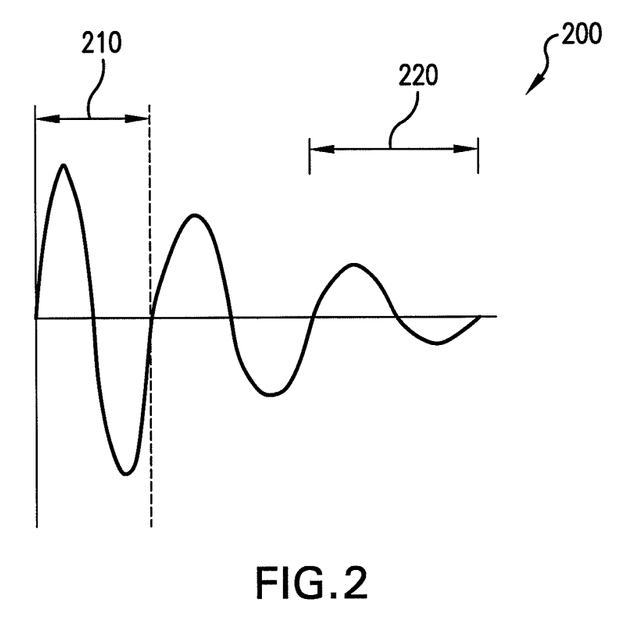
FIG. 2 is a graph of the frequency of vibration of a surface during excitation and as the surface returns to rest according to one embodiment.

For example, FIG. 2 shows a graph 200 of the frequency of vibration of a surface during excitation and as the surface returns to rest according to one embodiment of the present invention. As can be seen, the period 210 of the vibration of the surface during excitation is faster than the resonant period 220 of the surface as it returns to rest. However, even after excitation at a non-resonant frequency, the surface tends to vibrate at a resonant frequency when an input force is no longer driving the surface. By measuring the period of vibration of the surface as it returns to rest, the computer 101 may determine the resonant frequency of the surface.

Methods for Determining a Resonant Frequency

Figure 3:
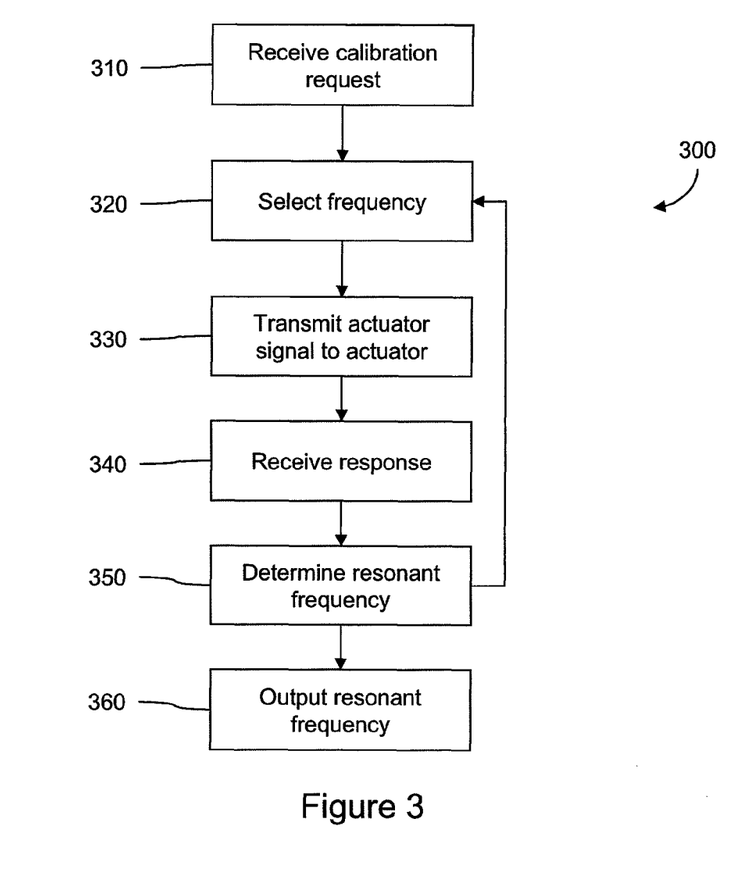
FIG. 3 is a flowchart of a method for resonance detection according to one embodiment.

FIG. 3 shows a flowchart 300 of a method for resonance detection according to one embodiment of the present invention. The method shown in FIG. 4 will be discussed in light of the system shown in FIG. 1, though, as will be described below, different systems may be used to perform the method.

The method 300 begins in block 310 when the processor receives a request for calibration. The request for calibration indicates that the processor should determine the resonant frequency of a surface. In one embodiment of the present invention, the request indicates for which of a plurality of surfaces the processor should determine a resonant frequency. For example, the processor may be in communication with a plurality of actuators, each actuator coupled to a different surface. In one embodiment of the present invention, the processor receives the request from a user input, such as from a menu selection. In another embodiment, the processor receives the request from a remote processor. For example, the processor may receive a request from a remote processor as a part of the manufacturing processor, whereby the remote processor requests that the processor determine the resonant frequency of the surface of the device housing. Still further embodiments may receive calibration requests from other sources, such as a network or as a result of a boot-up process.

In block 320, the computer selects a frequency of a vibration to output to the surface. For example in some embodiments of the present invention, a frequency is selected to cause an actuator to output a substantially sinusoidal vibration at a selected frequency. In such a case, the actuator is configured to output a sinusoidal vibration comprising substantially only the selected frequency. For example, a frequency of 130 hertz (Hz) may be selected.

In other embodiments, it may be desirable to transmit an actuator signal comprising a plurality of frequencies, such as a frequency sweep (described in detail below) or a square wave. For example, a frequency sweep comprises the sequential application of a plurality of selected frequencies. The first selected frequency is configured to cause actuator to output a vibration comprising substantially only the selected frequency. As the frequency sweep progresses, the selected frequency is changed such that the actuator outputs a vibration comprising only the new selected frequency. The frequency sweep continues until each of the desired frequencies has been output. In further embodiments, any arbitrary waveform may be used.

In block 330, the computer transmits an actuator signal to an actuator 103 coupled to a surface of a device, such as a touch screen 102. The actuator signal is configured to cause the actuator 103 to output a force to the surface.

A computer may transmit an actuator signal directly to an actuator, or it may transmit the actuator signal to another processor. For example, in one embodiment of the present invention, the computer may be in direct communication with an actuator, and may be configured to output signals configured to drive the actuator. However, in another embodiment, an actuator, a surface, and a local processor may be contained within a device in communication with the computer. In such an embodiment, the computer may transmit an actuator signal to the local processor, which may then generate a signal configured to drive the actuator.

Further, the computer may transmit an actuator signal comprising a high-level or a low-level command to the device. In general, a high-level command comprises parametric information about a force to be generated, such that the device's processor is capable of generating the desired vibration by calculating the shape of the waveform using the parametric information. While a low-level command comprises information detailing the shape of the waveform, such as sampled points along the waveform, which may allow the device's processor to output a signal to drive the actuator without having to calculate the shape of the waveform.

Figure 4:
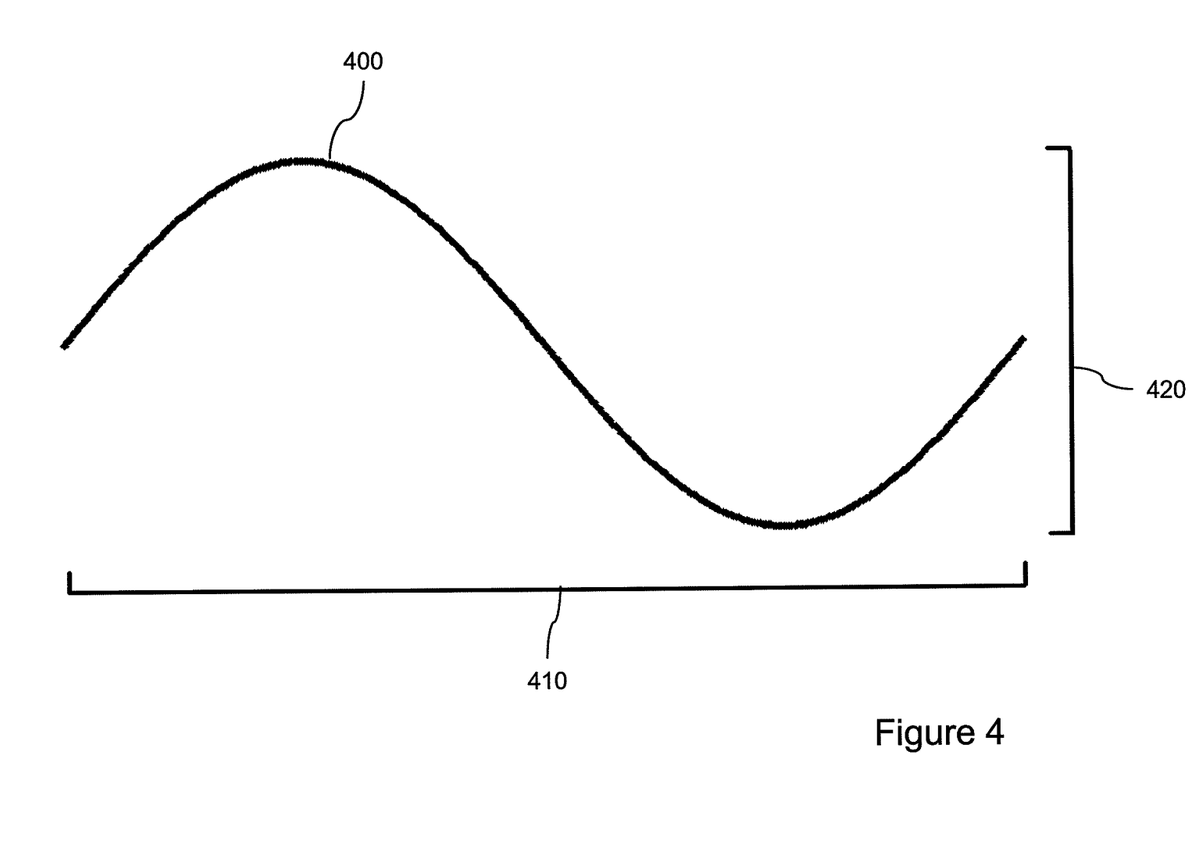
FIGS. 4 and 5 are illustrations of waveforms to be generated by an actuator according to one embodiment.

FIG. 4 shows a waveform to be generated by an actuator according to one embodiment of the present invention. In this embodiment of the present invention, the processor 110 may generate a high-level command to output the waveform shown in FIG. 4. In such an embodiment, the processor may output an actuator signal comprising a frequency parameter, a magnitude parameter, and a waveform parameter. To generate the waveform shown in FIG. 4, the high-level command may comprise a frequency 410, such as 140 Hz, a magnitude 420, such as 250 volts, and a waveform type, such as sinusoidal. The command may then be transmitted to the actuator, which then may generate a 140 Hz sinusoidal vibration, generated by a 250 volt peak-to-peak driving signal.

High-level commands may also include other parameters or parameter values. For example, a high-level command may include multiple parameters associated with a single force, such as a plurality of frequency parameters. The parameters included within the high-level command may comprise a wide range of values. For example and without limitation, a waveform parameter may specify a sinusoidal waveform, a square waveform, a saw-toothed waveform, an impulse waveform, or a user-defined waveform. A frequency parameter may define one or more frequencies or one or more periods to use to generate the force. A magnitude parameter may specify a peak magnitude, an average magnitude, or a minimum magnitude. It may also specify the magnitude in one or more different units, such as, without limitation, voltage, current, or displacement of the surface. Still other parameters may be included within a high-level command.

Figure 5:
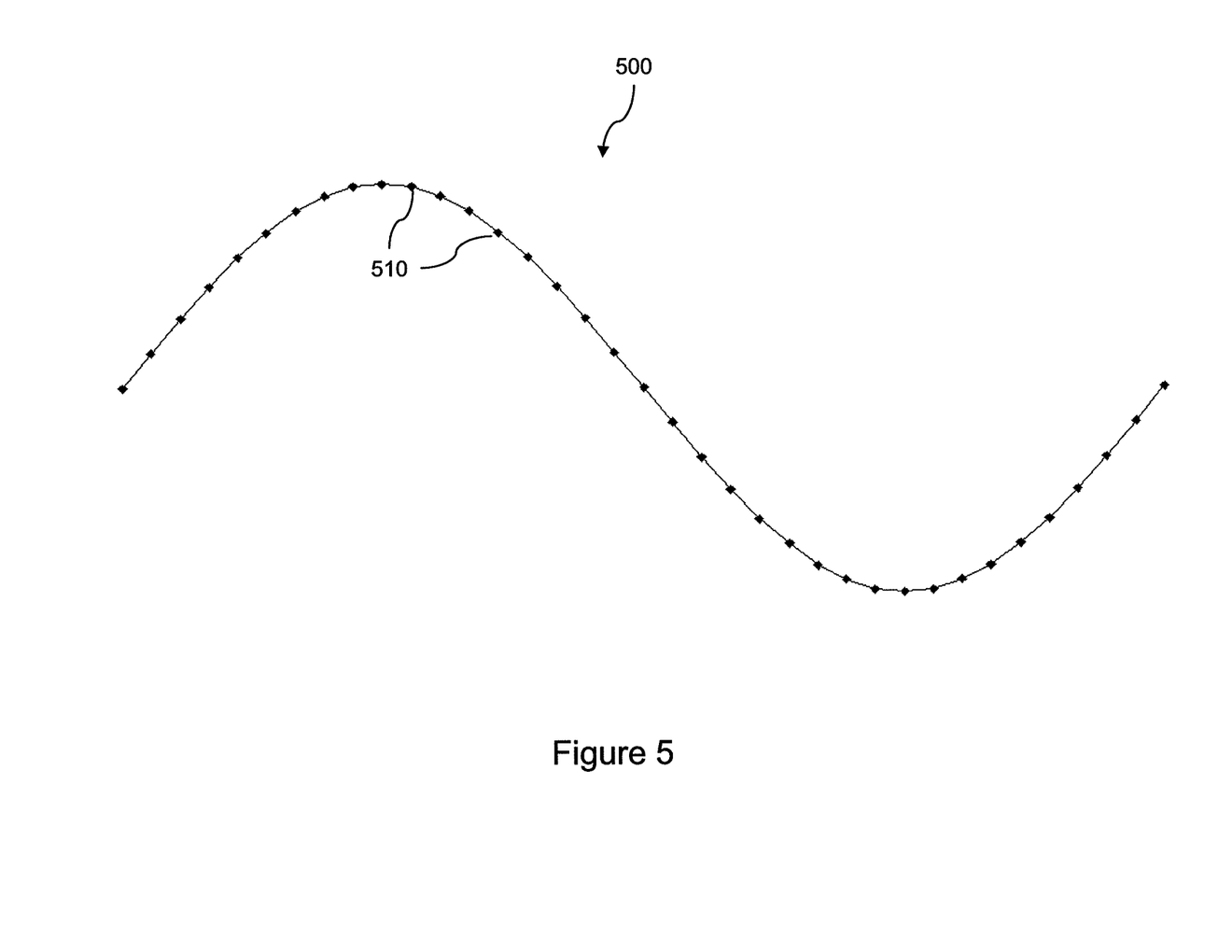

While some embodiments may transmit an actuator signal having a high-level command, other embodiments may transmit an actuator signal with low-level information. For example, according to one embodiment, the actuator signal may comprise points along the waveform describing the force. In another embodiment, the actuator signal may comprise a function describing a waveform to be generated. FIG. 5 shows a waveform 500 to be generated by an actuator according to one embodiment. In producing the waveform 500, the actuator signal is generated using a low-level command, including points 510 along the waveform that may be incorporated into the low-level command.

A low-level command may be advantageous in some embodiments. Further, low-level actuator signals may be advantageous as they may allow for the transmission of custom waveforms. High level commands may comprise custom waveforms as well. In such an embodiment, the shape of the waveform is specified, such as by parametric information or by including points along the waveform, similar to the way in which a waveform is specified in a low-level command. While various types of commands have been characterized as high-level and low-level, these are simply convenient descriptions used herein and are not intended to limit the types or scope of commands that may be used in various embodiments. Rather, any actuator signal configured to cause an actuator to output a desired waveform can be used.

In another embodiment, a processor, such as processor 110, may output an actuator signal that directly drives an actuator 103. For example, the processor 110 may output a sinusoidal actuator signal to a piezo-electric element configured to output a force on a surface of a touch-sensitive input device. In this embodiment, the sinusoidal actuator signal is configured to be a drive signal that is transmitted directly to the actuator (such as a piezo-electric element, or a motor). In one piezo-electric embodiment, the processor 110 may generate a substantially single frequency sinusoidal actuator signal configured to drive a piezo-electric element. The piezo-electric element receives the actuator signal, and imparts a vibration on the surface, the vibration having a frequency approximately equal to the frequency of the actuator signal. In such an embodiment, the processor 110 is responsible for driving the actuator 130, rather than sending a signal to other processing circuitry to generate a signal to drive the actuator as was described with respect to the high-level and low-level command embodiments above. However, in some embodiments, an actuator drive signal may be transmitted through one or more circuit components before being received by the actuator. For example, a processor may transmit the actuator drive signal to an amplifier or a filter before the actuator signal is transmitted to the actuator.

While in some embodiments actuator signals may be transmitted which comprise substantially only one frequency, in other embodiments actuators signals may be transmitted which comprise a plurality of frequencies. For example, in one embodiment, the computer 101 may output an actuator signal having a plurality of frequencies output in series, such as a frequency sweep. In such an embodiment, the computer 101 can output a high-level command having a first frequency, a second frequency, a step size, and a waveform type. The first and second frequencies may specify the start and end frequencies for the frequency sweep, and the step size may specify the incremental frequencies to use between the first and second frequencies. The waveform type may indicate a frequency sweep.

In one embodiment using a frequency sweep, the first and second frequencies should be selected such that it is likely that the resonant frequency of the surface falls between the first and second frequencies. Thus, in a frequency sweep, the computer 101 outputs a sequence of selected frequencies beginning with the first frequency, and increments to successive selected frequencies using the step size. If the first and second frequencies are selected appropriately, the resonant frequency of the surface will fall between the two, and will be identified as one of the selected frequencies during the frequency sweep. Additional embodiments may output high-level commands comprising different parameters.

In block 340, the computer 101 receives a response related to the force applied to the surface. For example, as was discussed previously, the computer 101 may receive a signal generated by a piezo-electric element in response to movement of the surface. After the actuator stops outputting the force, the surface may continue to vibrate, which causes the piezo-electric element to output a current indicating a response of the surface to the force. The response is then received by the computer 101.

For example, in one embodiment, the actuator may comprise a piezo-electric element, which is in communication with the computer 101. The piezo-electric element may transmit voltage or current signals directly to the signal processor, such as over a wire coupled between the piezo-electric element and the computer 101. In a related embodiment, the piezo-electric element may be coupled to the computer 101 through additional circuitry, such as an amplifier or a filter.

Such an embodiment may be advantageous to provide input signals to the computer 101 having voltage or current values within a range receivable by the computer 101, or for providing filtered voltage or current values to the computer 101. In a further embodiment, the surface and the actuator may be contained within a device having a processor. The device's processor may be configured to receive voltage or current signals from the piezo-electric element and transmit response information to the computer 101. For example, the device's processor may receive signals from a piezo-electric element, sample the signals at a sampling rate, store the sampled values, and transmit the sampled values to the computer 101, such as through a network connection.

In block 350, the computer 101 determines a resonant frequency of the surface based at least in part on the response. After the computer 101 has received a signal indicating the response of the surface to the force, the computer 101 analyzes the response to determine whether the response indicates the resonant frequency of the surface. For example, referring again to FIGS. 2 and 3, in one embodiment of the present invention, the computer 101 may analyze a response 200, 300 of the surface to a force, and determine the presence or size of a plateau 320, such as may be seen in FIG. 3. In one embodiment, the determination may be an iterative process. For example, a computer 101 may not detect a plateau in a received response 200. The computer 101 may then re-perform steps 320 and 340, and analyze the received response 300 to determine the resonant frequency.

According to one embodiment, it may be possible to determine a plurality of resonant frequencies of a surface by returning to block 320. For example, it may be possible to determine a first resonant frequency of a surface when nothing is contacting the surface. It may be possible to determine a second resonant frequency when an object, such as a finger, is contacting the surface. It may be possible to determine further resonant frequencies when a plurality of objects are contacting the surface, or for an object contacting the surface at different locations. For example, in one embodiment, the first resonant frequency may comprise the fundamental frequency of the surface, and the second resonant frequency may comprise an integer multiple of the fundamental frequency. A fundamental frequency describes the lowest resonant frequency of the surface. Using such an embodiment, it may be possible to output haptic effects at the resonant frequency associated with a state of the surface. For example, the first resonant frequency may be generated if no objects are in contact with the surface, and the second resonant frequency may be output when an object is contacting the surface.

In one embodiment, the computer may determine a resonant frequency by transmitting a series of actuator signals to generate a plurality of forces in sequence. For example, the computer may continue to iterate successive actuator signals having different selected frequencies until a resonant frequency is found. According to one embodiment, a computer 101 generates a first actuator signal having substantially only one first frequency at a frequency below the resonant frequency. The actuator then generates a first force to output to the surface. The computer 101 in such an embodiment receives a first response of the surface to the first force.

The computer then determines a first magnitude in the received first response and stores the first magnitude and the first frequency. The computer then transmits a second actuator signal having a second frequency greater than the first frequency. The actuator outputs a second force to the surface, and the computer 101 receives a second response of the surface to the second force. The computer determines a second magnitude in the second response and compares it to the first magnitude in the first response. If the second magnitude is greater than the first magnitude, the computer may discard the first magnitude and the first frequency, and store the second magnitude and the second frequency. The computer then continues to transmit actuator signals and receive responses to the signals. For each response received, the computer determines a magnitude within such response and compares it with the stored response to determine the largest response. The computer may continue to output actuator signals while the magnitudes in the received responses continue to increase, and may determine a resonant frequency after one or more received responses have magnitudes smaller than the stored plateau.

In one embodiment, a surface may comprise a multi-touch input surface, such as a multi-touch touch screen. In such an embodiment, a system for resonant detection may transmit a series of actuator signals to determine a plurality of resonant frequencies associated with a multi-touch input surface. Such an embodiment may be employed to determine resonant frequencies of the multi-touch input surface during a contact with the surface at one or more locations simultaneously or in succession.

In another embodiment, a surface may comprise a multi-output surface. Such a surface may be coupled to a plurality of actuators configured to output localized forces to discrete areas of the touch surface. For example, a touch surface having a rectangular shape may be coupled to four actuators, wherein each actuator is coupled to a different quadrant of the touch surface. Each actuator may be configured to output a localized force to the corresponding quadrant of the touch surface. Thus, an embodiment may be configured to determine a resonant frequency of the surface associated with each of the actuators.

Figure 6:
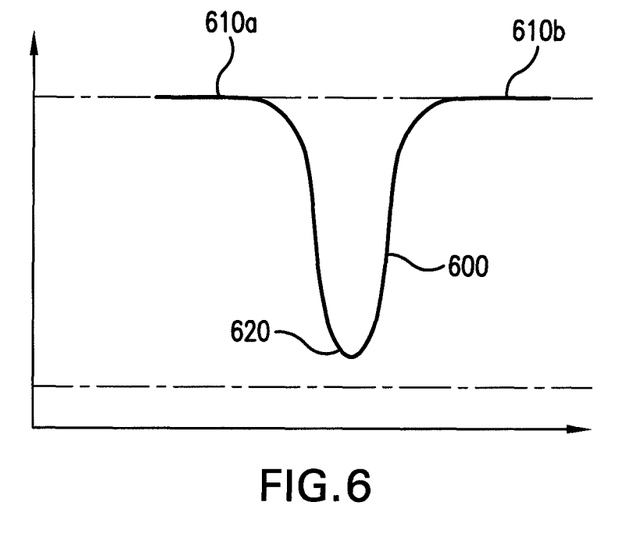
FIG. 6 is a graph illustrating a response to an actuator signal according to one embodiment.

FIG. 6 is a graph illustrating an electrical resistance response 600 to an actuator signal according to one embodiment. The response 600 (vertical axis) shown in FIG. 6 results from measured resistance of a piezo-electric actuator device due to an input frequency sweep (horizontal axis) to the piezo-electric actuator device. As can be seen, the response comprises two relatively high-magnitude portions 610a and 610b and a low-magnitude trough 620. The areas of high-magnitude indicate relatively high electrical resistance across the piezo-electric actuator, while the bottom of the trough 620 indicates relatively low resistance across the piezo-electric actuator. The computer 101 may receive the response 600 and determine a resonant frequency by determining the frequency at which the piezo-electric actuator exhibited the least electrical resistance (i.e., trough 620).

Figure 7:
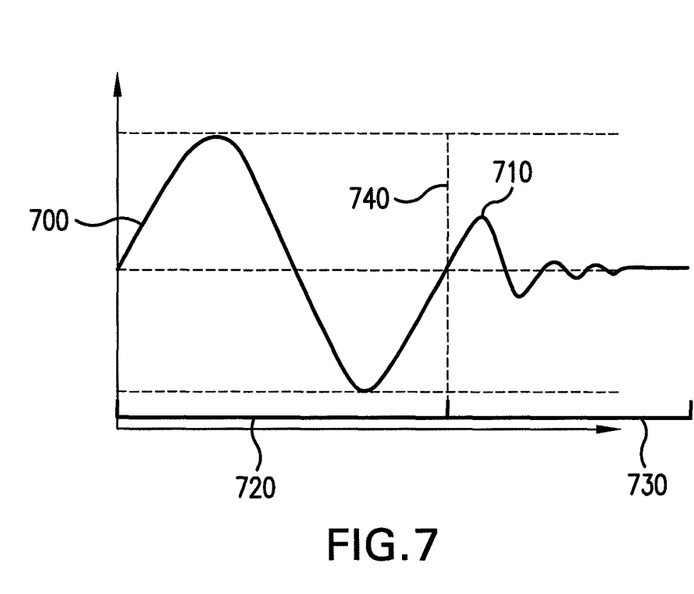
FIG. 7 is a graph illustrating a response to an actuator signal according to one embodiment of the present invention.

FIG. 7 is a graph illustrating a response 700 to an actuator signal according to one embodiment. In the graph shown in FIG. 7, the response 700 indicates the movement of a surface of a device based on a force output by an actuator. In the graph shown in FIG. 7, the horizontal axis indicates the time at which the sample was taken, while the vertical axis indicates the displacement of the surface. At the time 720 prior to cutoff 740, the actuator is outputting a force. At approximately cutoff 740, the actuator stops outputting the force and the surface is allowed to return to a resting position. The natural response 710 of the surface indicates continued vibration that dissipates over time 730. The duration 730 during which the surface continues to vibrate is measured by the computer 101 and stored. The system 100 then vibrates the surface at other frequencies and measures duration 730 of the natural response 710 for each of the other frequencies. The frequency of the force that generated the maximum duration 730 of the natural response 710 may be determined to be the resonant frequency of the surface.

In block 360, the computer 101 outputs the resonant frequency. After the computer 101 has determined a resonant frequency for the surface, the computer may output the resonant frequency by saving the frequency in a non-volatile computer-readable medium, it may display the frequency on a display screen, it may generate an actuator signal having the resonant frequency, or it may otherwise output the frequency according to methods known to those of skill in the art.

While the description above describes various embodiments for resonance detection, some embodiments of the present invention may comprise additional or different steps. For example, when an object is contacting a surface, its resonant frequency may change. Therefore, it may be desirable to determine a resonant frequency of a surface when a user is touching the surface. Further, the resonant frequency may change based on where the contact is applied to the surface. Thus, it may be desirable in some embodiments to calculate one or more resonant frequencies based on contact with the surface at one or more locations. In such embodiments, an actuator signal may be based at least in part on a location of a sensed contact with the surface.

In a further embodiment, the computer 101 may be configured to detect a dynamically changing resonant frequency. For example, as a user touches a surface (or stops contacting the surface), the resonant frequency of the surface may change. Thus, it may be desirable to determine a resonant frequency for a plurality of contact pressures. In such an embodiment, a system for resonant detection may be configured to determine a plurality of resonant frequencies associated with pressures associated with, for example, a user initiating a contact with a surface (such as by pressing a finger against the surface), or ending a contact with a surface (such as be removing the finger from the surface).

An advantage of the foregoing approach may be that a system for outputting haptic vibrations can output higher magnitude vibrations with a relatively lower magnitude input signal. Generally, when a system is driven at resonance, small energy inputs at the resonant frequency can be significantly amplified to generate a more dramatic output. Thus, it may be more efficient to drive a system at resonance. Further, because surfaces may vary in construction, surfaces in otherwise similarly-designed devices may have different resonant frequencies. Or, as a surface is used, it may become worn or its resonant frequency may change. Further, the resonant frequency of a surface may change if it is being contacted, such as by a fingertip. Thus, it may be desirable to incorporate some or all of the various embodiments discussed herein into a calibration system for such devices. Such a calibration system may be incorporated into the device itself, or it may be used during a manufacturing process, or both.

Certain embodiments may comprise a computer-readable medium storing program code for instructing a machine or computer to carry out one or more of the methods described above. Such a machine or computer may be capable of determining the resonant frequency of a haptic surface. For example, the machine or computer may determine the resonant frequency of the haptic surface periodically, or when commanded by a user. Further, such a machine or computer may determine a resonant frequency of a surface when the surface is being contacted, such as by a user. It may be desirable to determine a resonant frequency at such at time as the actuator will likely be outputting a haptic effect to the surface when it is being contacted by a user.

Figure 8:
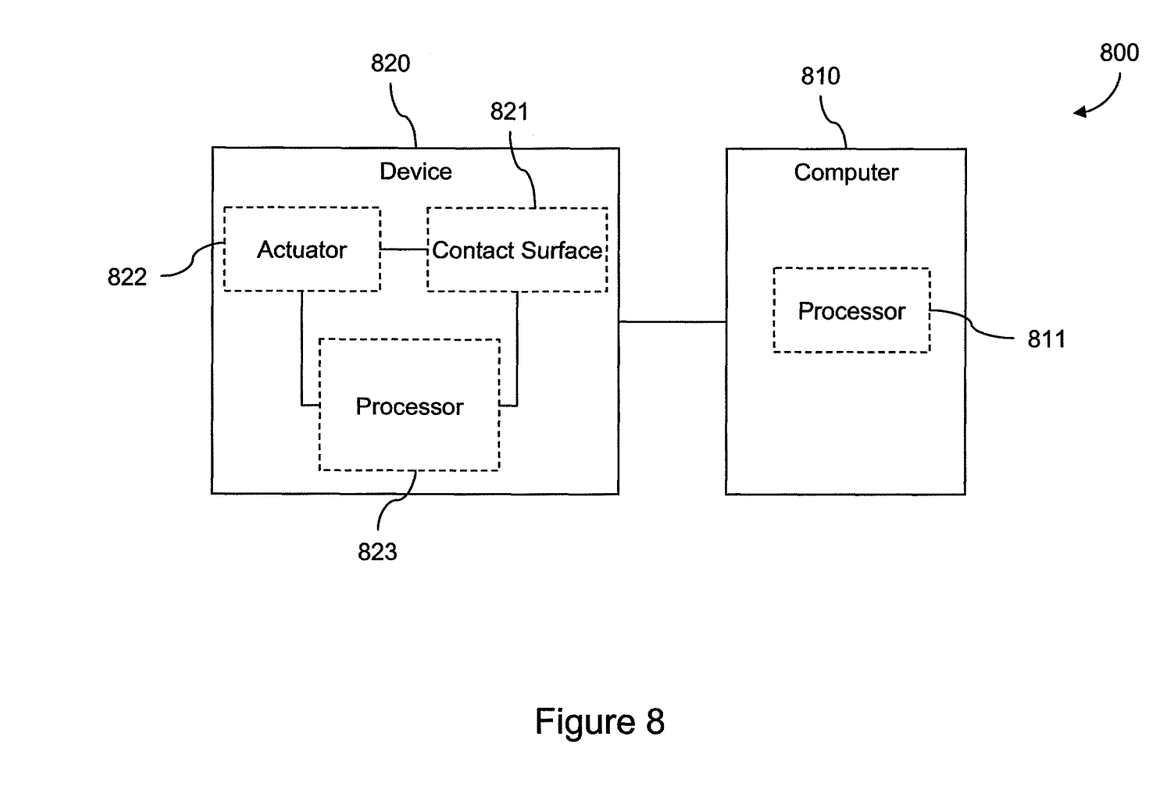
FIG. 8 is a block diagram illustrating a system for resonance detection according to one embodiment.

FIG. 8 is a block diagram illustrating a system 800 for resonance detection according to one embodiment. The system 800 comprises a computer 810 and a device 820. The computer 810 comprises a processor 811, and is in communication with the device 820. The processor 811 is configured to output an actuator signal to the device 820, and to receive an input signal from the device 820. The device 820 comprises a surface 821, an actuator 822, and a processor 823. The processor 823 is in communication with the actuator 822 and the surface 821, and is configured to receive an actuator signal from the computer 810, transmit an actuator drive signal to the actuator 822, and receive a sensor signal.

In the embodiment shown in FIG. 8, the actuator 822 comprises a suitable actuator for generating a force on the surface. For example, in one embodiment of the present invention, the actuator 822 comprises a piezo-electric actuator. Such an embodiment may be advantageous because a piezo-electric element can act as a sensor configured to sense the movement of the surface 821; a piezo-electric element may generate a voltage when compressed or stretched, such as by a vibrating surface. The generated voltage can be measured and used to determine a corresponding movement of the surface. Other actuators may be used as well. For example, the actuator 822 may comprise an electric motor, an electromagnetic actuator, a voice coil, a linear resonant actuator, a shape memory alloy, an electro-active polymer, or other suitable actuator capable of sensing movement. In one embodiment of the present invention, an electric motor may be employed to sense the movement of the surface. For example, the electric motor may comprise a transducer capable of outputting a force, and also sensing the movement of the transducer. Such a transducer may comprise an optical encoder, or may be capable of generating voltages or currents proportional to a movement of the transducer.

The surface 821 shown in FIG. 8 may be any surface of the device that a user may contact. For example, in one embodiment, the surface may be a surface of a touch screen. In another embodiment, the surface may be a surface of a cell phone or a PDA configured to provide haptic sensations to a user holding the device. In other embodiments, the surface may be a part of an input device, such as a touch screen or a button. In some embodiments, the surface may be any of the following without limitation: a surface of a housing of a device, such as a battery cover on a cell phone, a touch screen in the console of an automobile, a touch sensitive surface within the automobile, a touch screen on a laptop or personal computer, a touch screen on an automated teller machine or other terminal device, or a touch-sensitive surface, either transparent, translucent, or opaque. Any suitable surface may be advantageously employed.

Figure 9A:
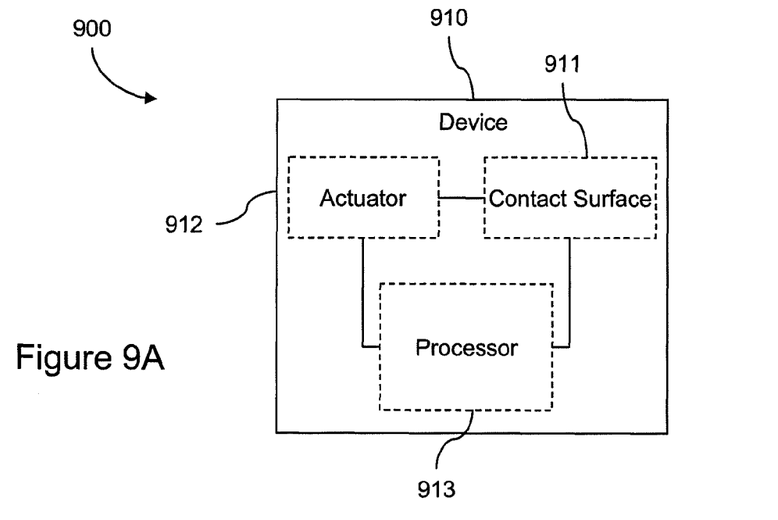
FIGS. 9A and 9B are block diagrams illustrating systems for resonance detection according to a first and a second embodiment, respectively.

FIG. 9A is a block diagram illustrating a system 900 for resonance detection according to one embodiment. The system 900 is similar to other systems described herein, however, the system 900 shown in FIG. 9A comprises a single, self-contained device 910 comprising a surface 911, an actuator 912, and a processor 913. The device 910 is capable of determining the resonant frequency of its own surface 911. The processor 913 is in communication with the actuator 912 and the surface 911. In the embodiment shown in FIG. 9A, the processor is configured to transmit an actuator signal, receive a sensor signal, and determine a resonant frequency of the surface. The processor 913 may also be configured to receive an input signal from the surface 911. The actuator 912 is in communication with the processor 913 and the surface 911, and is configured to receive an actuator signal from the processor 913, output a vibration to the surface 911, and to transmit a sensor signal to the processor 913. In the embodiment shown, the actuator outputs a vibration to the surface 911, and also operates as a sensor to measure the movement of the surface 911 in response to the vibration. The actuator 912 transmits a sensor signal to the processor 913 based at least in part on the sensed movement of the surface 911.

Figure 9B:
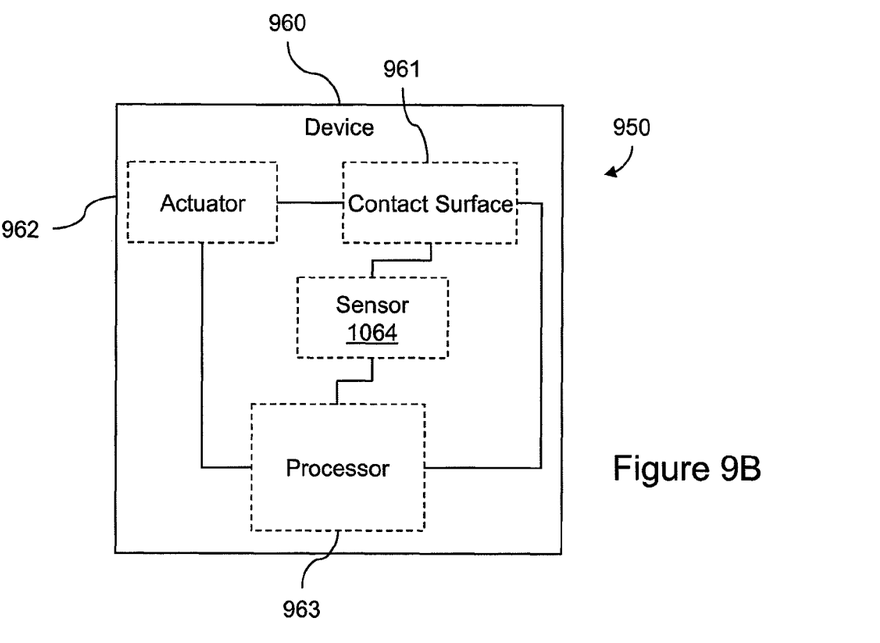

FIG. 9B is a block diagram illustrating a system 950 for resonance detection according to one embodiment. The system 950 is similar to the embodiment shown in FIG. 9A, but also includes a sensor 964 separate from the actuator 962. Other embodiments may also incorporate a sensor distinct from the actuator, such as other embodiments described in this specification.

The system 950 comprises a device 960, which comprises a surface 961, an actuator 962, a processor 963, and a sensor 964. The processor 963 is in communication with the actuator 962, the surface 961, and the sensor 964. The processor is configured to transmit an actuator signal to the actuator 962, receive a sensor signal from the sensor 964, and an input signal from the surface 961. The actuator is configured to receive an actuator signal from the processor 963, and to output a vibration to the surface 961. The sensor 964 is configured to measure a response of the surface 961 to a vibration output by the actuator 962. The sensor 964 may also be configured to detect a contact with the surface 961 by a user.

Embodiments may be advantageously employed in a variety of scenarios. For example, one embodiment may be advantageously incorporated into a manufacturing facility of devices having haptically-enabled surfaces, such as haptically-enabled touch screens. Such a facility may employ one or more embodiments to determine the resonant frequency of each manufactured device's surface and store the resonant frequency within the device, such as on a computer readable medium.

Alternatively, a device may comprise one or more embodiments. For example, a navigation system in a vehicle may comprise a touch screen. The navigation system may also comprise an embodiment configured to determine the resonant frequency of the surface of the touch screen. The embodiment may be employed by the user to determine the resonant frequency of the touch screen when nothing is contacting the screen. Alternatively, the navigation system may determine the resonant frequency of the touch screen each time it is powered on, or periodically, such as every three months.

Referring again to FIGS. 1, 8, and 9A-9B, embodiments can be implemented in digital electronic circuitry, or in computer hardware, firmware, software, or in combinations of them. In one embodiment, a computer may comprise one or more processors. The processor comprises a computer-readable medium, such as a random access memory (RAM) coupled to the processor. The processor executes computer-executable program instructions stored in memory, such as executing one or more computer programs for editing an image. Such processors may comprise a microprocessor, a digital signal processor (DSP), an application-specific integrated circuit (ASIC), field programmable gate arrays (FPGAs), state machines, and the like. Such processors may further comprise programmable electronic devices such as programmable logic controllers (PLCs), programmable interrupt controllers (PICs), programmable logic devices (PLDs), programmable read-only memories (PROMs), electronically (eraseable) programmable read-only memories (EPROMs or EEPROMs), or other similar devices.

Such processors may comprise, or may be in communication with, media, for example computer-readable media, that may store instructions that, when executed by the processor, can cause the processor to perform the steps described herein as carried out, or assisted, by a processor. Embodiments of computer-readable media may comprise, but are not limited to, an electronic, optical, magnetic, or other storage or transmission device capable of providing a processor, such as the processor in a web server, with computer-readable instructions. Other examples of media comprise, but are not limited to, a floppy disk, CD-ROM, magnetic disk, memory chip, ROM, RAM, ASIC, configured processor, all optical media, all magnetic tape or other magnetic media, or any other medium from which a computer processor can read. Also, various other devices may transmit or carry instructions to a computer, such as a router, private or public network, or other transmission device. The processor, and the processing, described may be in one or more structures, and may be dispersed through one or more structures. The processor may comprise code for carrying out one or more of the methods (or parts of methods) described herein.

General

The foregoing detailed description has been presented only for the purpose of illustration and description and is not intended to be exhaustive or to limit the invention to the precise forms disclosed. Numerous modifications and adaptations thereof will now be apparent to those skilled in the art without departing from the spirit and scope of the invention.

That which is claimed is:

1. A system comprising:
an actuator configured to receive an actuator signal and to output a force to a surface;
a sensor configured to detect a response to the force and to transmit a sensor signal associated with the response;
a processor configured to:
transmit the actuator signal;
receive the sensor signal;
determine a resonant frequency of the surface based at least in part on the sensor signal, wherein the resonant frequency is based in part on a user interaction; and
output a signal associated with the resonant frequency.

2. The system of claim 1, wherein the actuator comprises a piezoelectric actuator.

3. The system of claim 2, wherein the piezoelectric actuator is configured to generate a voltage based at least in part on the response.

4. The system of claim 1, wherein the force comprises a frequency and a duration.

5. The system of claim 1, wherein the processor is further configured to receive a request for calibration.

6. The system of claim 1, wherein the processor is further configured to determine a plurality of resonant frequencies, wherein the plurality of resonant frequencies are associated with an object contacting the surface.

7. A non-transitory computer-readable medium comprising program code, the program code comprising:
program code for transmitting an actuator signal to an actuator, the actuator signal configured to cause the actuator to output a force to a surface;
program code for receiving a response to the force;
program code for determining a resonant frequency of the surface based at least in part on the response, wherein the resonant frequency is based in part on a user interaction with the surface; and
program code for outputting a signal indicative of the resonant frequency.

8. The computer-readable medium of claim 7, wherein the resonant frequency comprises a fundamental frequency of the surface.

9. The computer-readable medium of claim 7, wherein the force comprises a frequency and a duration.

10. The computer-readable medium of claim 9, wherein the frequency increases during the duration.

11. The computer-readable medium of claim 7, wherein the actuator comprises a piezoelectric actuator.

12. The computer-readable medium of claim 11, wherein the piezoelectric actuator is configured to generate a voltage based at least in part on the response of the surface.

13. The computer-readable medium of claim 7, further comprising program code for selecting at least one selected frequency, and wherein the force comprises a vibration at substantially only the selected frequency.

14. The computer-readable medium of claim 7, wherein measuring the response comprises measuring a magnitude of the response.

15. A method comprising:
  transmitting an actuator signal to an actuator, the actuator signal configured to cause the actuator to output a force to a surface;
  receiving a response of the surface to the force;
  determining a resonant frequency of the surface based at least in part on the response, wherein the resonant frequency is based in part on user interaction; and
  outputting a signal indicative of the resonant frequency.

16. The method of claim 15, wherein the actuator comprises a piezoelectric actuator.

17. The method of claim 16, wherein the piezoelectric actuator is configured to generate a voltage based at least in part on the response of the surface.

18. The method of claim 15, wherein the force comprises a frequency and a duration.

19. The method of claim 18, wherein the frequency increases during the duration.

20. The method of claim 15, further comprising determining a plurality of resonant frequencies, and outputting the plurality of resonant frequencies, wherein the plurality of resonant frequencies are associated with an object contacting the surface.

\* \* \* \* \*

UNITED STATES PATENT AND TRADEMARK OFFICE
CERTIFICATE OF CORRECTION

| | | |
|---|---|---|
| PATENT NO. | : 8,590,379 B2 | Page 1 of 1 |
| APPLICATION NO. | : 13/446190 | |
| DATED | : November 26, 2013 | |
| INVENTOR(S) | : Kollin M. Tierling et al. | |

It is certified that error appears in the above-identified patent and that said Letters Patent is hereby corrected as shown below:

On the Title page, Column 1, Item (75), "Inventors", Line 1, please delete "Militas", please insert -- Milpitas --.

Signed and Sealed this
Eleventh Day of March, 2014

Michelle K. Lee
*Deputy Director of the United States Patent and Trademark Office*